United States Patent [19]

Merz

[11] 3,985,346

[45] Oct. 12, 1976

[54] METHOD FOR MIXING SHAKEN DRINKS

[76] Inventor: William James Merz, 220 W. Rittenhouse Square, Philadelphia, Pa. 19103

[22] Filed: Nov. 27, 1974

[21] Appl. No.: 527,630

[52] U.S. Cl. .............................. 259/72; 259/DIG. 23
[51] Int. Cl.² .......................................... A47J 43/27
[58] Field of Search .............. 259/1 R, 72, DIG. 23, 259/DIG. 25, DIG. 27

[56] References Cited
UNITED STATES PATENTS

| 832,640 | 10/1906 | Tracey | 259/DIG. 23 |
| 2,208,431 | 7/1940 | Rochow | 259/72 |
| 2,557,801 | 6/1951 | Shapiro | 211/113 X |

Primary Examiner—Stanley N. Gilreath
Assistant Examiner—Alan Cantor
Attorney, Agent, or Firm—Synnestvedt & Lechner

[57] ABSTRACT

A method for using an array of bar accessories to facilitate preparation of the sort of drink which is made by shaking together liquor and ice with a suitable premix. Several shaker shells are hung by their pedestal bases from C-shaped racks. Each shaker shell carries indicia which match indicia carried on a rack. The glass in which the drink is served cooperates with the shaker shell. Ice, liquor and premix are combined in such proportion as to fill precisely the type of glass appropriate to each drink.

3 Claims, 7 Drawing Figures

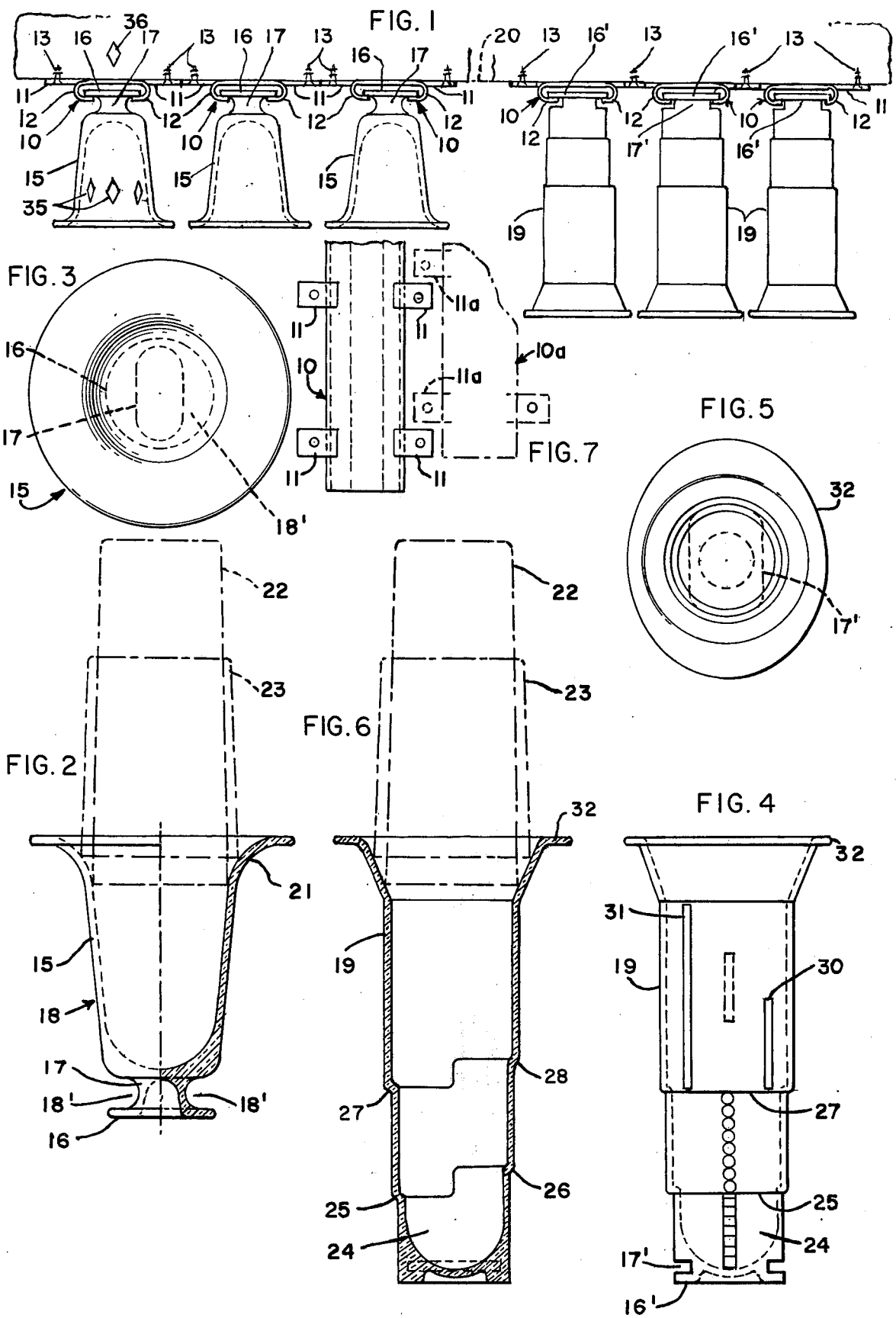

METHOD FOR MIXING SHAKEN DRINKS

This invention relates to the preparation of "on-the-rocks" types of mixed drinks, of the kinds which are shaken with ice, which under conventional methods use a mixing glass and a shaker shell to form a tight composite container which is shaken until the contents is sufficiently mixed and cooled, and is opened after shaking to pour the desired drink from the shaker shell, usually through an ice screen, into a serving glass in which ice has usually been placed.

The conventional method of filling an order for a drink of the type here under discussion, such as a Whisky Sour "on the rocks", is this: the bartender wipes the bar top and picks up a shaker glass, which he sets on top of the bar, sometimes scooping up cracked ice in it, en route. Alternatively, he may set the shaker glass on the bar top and fill it by picking up an ice scoop, dipping it into the ice, and pouring ice from scoop to shaker glass. The scoop is then returned to its place. He then picks up the whisky jigger, and the whisky bottle, pours the whiskey into the jigger, and pours the measured quantity in the jigger into the shaker glass, following which he puts down the jigger and puts down the whisky bottle.

Now, under the coventional method, he picks up the bottle of premix, which contains the materials prepared in advance for use in making a Whisky Sour, such as lemon juice, sweetening, and flavoring. This is measured into the whisky jigger, and poured into the shaker glass. Since two portions of premix are customarily used in relation to one of whisky, he repeats this step, making a second addition of premix, and then puts down the bottle of premix, and also the whisky jigger. Now, he picks up the metal shaker top and applies it to the shaker glass, and, holding the two tightly together, shakes until ice, whisky and premix have become one blended drink, at the desired degree of chill.

Now, he removes the metal shaker top and puts it down, sets the glass shaker bottom down on the bar top, picks up the serving glass, and sets it on the bar top. He picks up an ice scoop and pours ice into the serving glass. Then he picks up the ice strainer, places it in the shaker glass and pours the drink from the shaker glass into the serving glass. Then he puts down the strainer, throws away the remaining ice, then adds garnish (cherry - orange slice) to the drink, inserts a drinking straw, places on a paper doily, and at last he serves the guest.

After this, he must wash, rinse ans sterilize the metal shaker top, then wash, rinse and sterilize the glass shaker bottom. He also must wash, rinse and sterilize the strainer and usually the jigger also.

Among the objects of the invention are the following: To expedite the preparing of shaken drinks by reducing the number of operations involved from about 50 to less than half that number, thus reducing the time involved from 70 seconds to less than 30 seconds; to reduce the amount of ice used; to avoid the intermingling of residual flavors, such as might arise from using the same utensils to mix different drinks; to eliminate the risk of tasting any soap/detergent film not completely rinsed away; to avoid the necessity for quite so much washing, rinsing and sterilization; to ensure that the utensils used are so placed as to drain thermselves; and, in the preferred embodiment, to reduce the number of utensils needed, thus eliminating the need for handling them. The whisky jigger for instance is normally picked up and set down at least ten times in the making of a single drink. The need to pick up and set down the ice is reduced to one handling. The metal shaker top, the glass shaker and the strainer are eliminated entirely, and likewise the handling of them.

An incidental but quite desirable object of the invention is to provide an arrangement of bar accessories which may be mounted near the rear edge of the bar top, directly under the bar, which is an unusually convenient location.

How these and other objectives which are incident to my invention or which might occur to those skilled in the art may be attained will be better understood with reference to the description which follows, and which is prepared with reference to the accompanying drawings, in which:

FIG. 1 illustrates an array of bar accessories, comprising a series of slide racks and two types of shaker shells;

FIG. 2 illustrates one of the shaker shells shown on the left of FIG. 1, and shows in dot-and-dash lines the positions occupied by two types of serving glasses inserted into the shaker shell;

FIG. 3 is a plan view of the shaker shell shown in FIG. 2;

FIG. 4 illustrates, in front elevation, a measuring/shaker shell configured to serve measuring purposes as well as shaker purposes;

FIG. 5 is a plan view of the measuring/shaker shell shown in FIG. 4;

FIG. 6 is a sectional side view of the measuring/shaker shell shown in FIG. 4. As in FIG. 2, there are shown in dot-and-dash outline, two types of serving glasses which may be used with the measuring/shaker shell of my preferred embodiment; and FIG. 7 is a fragmentary plan view of one of the slide racks with an adjacent rack indicated in dot-and-dash lines with its securing tabs in staggered relation to the tabs of the adjacent rack thus enabling closer spacing of the racks.

The drawing diagrammatically illustrates, in FIG. 1, a series of slide racks 10, to be mounted beneath the top of the bar, for access from the rear. Each slide rack 10 has inturned rolled edges 12, with clearance between them, to form a C-shaped channel to support the pedestals of the utensils while permitting them to slide freely therein. The slide rack 10 has a series of tabs 11 running on both sides. As shown in the left half of FIG. 1, the tabs 11 are of such a length that when those on one rack are butted against the matching tabs 11 of the adjacent rack, the correct spacing between slides 10 is automatically provided, so that one utensil will not interfere with its neighbor. The spacing shown to the left in FIG. 1 is appropriate for shaker shells which have circular rims, as shown in FIG. 3.

Alternatively, as shown on the right in FIG. 1, closer spacing of the racks may be obtained by staggering the tabs 11a of one rack 10a with relation to the tabs 11 of the adjacent rack 10 as shown in FIG. 7. The oval rim of the glass in FIG. 5 permits such closer spacing of the racks.

The C-shaped slide racks 10 are attached to the underside of the bar top with wood screws 13 through the tabs 11. Each slide rack extends from the underside of the bar top which is nearest the bartender at right angles to the edge of the bar top, and towards the front of the bar, which is remote from the bartender. These slide racks are preferably deeper than a single pedestal of the utensils which they are intended to hold, so that each slide rack may support two or more utensils, one behind the other.

These utensils are of two tyes. The shaker shell 15 may be of glass or of plastic, or a combination of both. It has a pedestal 16 which is wide enough to be supported on the upper faces of the rolled edges 12 of the slide rack 10, and it has a neck 17 which is produced by narrowing the stem or base of the glass 18 so as to form companion slots 18',18' right and left, to be received between the rolled edges 12 of the slide rack 10. The neck 17 therefore has an almost rectilinear outline, so that it holds the glass which is nested in it quite firmly, thereby making it easy to use the structure shown without having one glass interfere with its neighbor or chip the edges or shift out of position.

To the right of the three shaker shells 15, in FIG. 1, three differently-shaped glasses 19 are shown, for purposes of illustration. The break 20 in between the tabs 11 indicates the possibility of indefinite extension. The measuring/shaker shells shown in this figure are provided, like the shaker shells in FIG. 2, with pedestals 16' each having a neck portion 17' and each of these is received between mating rolled edges 12 in the slide racks 10, so that the receptacle itself hangs upside down, in which position it quickly and thoroughly drains and dries.

In FIG. 2, one of the shaker shells 15 has been removed from the rack and stood upon its pedestal 16 with its neck 17 now free of the rolled edges 12 in slide rack 10. The mouth of this shaker shell may be either arcuate in section like the mouth of a bell, as shown at 21, or it may be tapered more or less sharply in frusto-conical form, as shown in FIG. 6. The purpose, of course, is to facilitate bringing the shaker shell 15 into sealing engagement with one of the serving glasses 22 or 23. For purposes of illustration, I have shown, in broken lines, two different size serving glasses. The inner one, numbered 22, is of the appropriate dimension for mixing such a drink as the "Tom Collins." It is similar to a highball glass. The outer one 23 is a lowball glass, such as is frequently used for such drinks as the "Alexander."

The measuring/shaker shell illustrated in FIGS. 4 and 6 is one of the measuring/shaker shells identified as 19 above. It is shaped interiorly so that it can be used to perform conventional measuring functions when it is used for preparing the type of drink which is here under discussion. The pedestal 16' and neck 17' are of the same size in the measuring/shaker shell 19 as in the shaker shell 15.

The lower portion of the measuring/shaker shell 19, immediately above the neck 17', is of relatively small diameter and of relatively low height. To facilitate measuring, it is desirable that there should be an indication at the base when the volume contained within the measuring/shaker shell reaches the level of 1 ounce. This is the volume of the space 24, which is indicated by an offset shoulder 25, which crosses the front of the measuring/shaker shell.

FIG. 6 is a side view in section of the measuring/shaker shell shown in front elevation in FIG. 4. It will be seen that the shoulder 25 extends towards the rear of the measuring/shaker shell only about halfway. At this point, the measuring/shaker shell is offset sidewise, to provide the shoulder 26, which does not appear in the face view. When the liquid in the bottom of the measuring/shaker shell reaches the level of the shoulder 26, the volume of the space below that level is preferably 1½ ounces.

In like manner, I have provided the shoulder 27, which marks the next step in the preparation of the type of drink which we are here considering, namely one in which an ounce or an ounce and a half of strong liquor or liqueur is used, in relation to premixed ingredients, such as a blend of lemon juice, sugar and possibly bitters, in proportions approximately double those of the strong drink or liqueur.

When there is one ounce of strong drink in the measuring/shaker shell, the shoulder 27 will preferably mark the level to be reached when 2 ounces of premix are added, and when the initial charge is 1½ ounces, that is, up to the shoulder 26, the addition of premix up to the level of the shoulder 28 will represent double the volume of the liquor below the shoulder 26.

Ice may then be added to the level shown by the top of the marker 31 when the large serving glass 22 is to be used; and to the level shown by the top of the marker 30 when the small serving glass 23 is to be used. This is to assure that the total volume of the hard liquor, the premix, and the ice does not exceed the volume of the respective serving glasses used.

Thereupon, the serving glass 22 or 23, as the case may be, is applied to the measuring/shaker shell, and securely held against the measuring/shaker shell 19. When the drink has been sufficiently shaken, the whole is inverted so that the measuring/shaker shell is on the top, and the drink with its ice therein is on the bottom. Removal of the empty measuring/shaker shell by separation leaves the drink in the serving glass, 22 or 23, ready to serve.

It is to be noted that, in the present circumstances, it is not necessary to wash away the excess liquid which remains in the measuring/shaker shell. This may safely be left in the measuring/shaker shell, for it is an important advantage of my present invention to employ a coding system for all of the accessories used. It is for this reason that the slide rack 10 has been designed so that by assembling one next to the other a plurality of slide racks may be provided, each of which is coded, preferably color coded, to show the type of drink intended to be mixed in the measuring/shaker shells which it holds. Similarly, identifying indicia may be applied to the measuring/shaker shell which match the indicia carried by the slide rack 10, so that each measuring/shaker shell is coded to match the coding of the slide in which it is carried.

When this has been properly attended to, the same measuring/shaker shells are always used to mix the same kind of drink, and that kind of drink only. They therefore do not need to be washed, rinsed or sterilized between drinks, in order to remove traces of flavoring before using them to mix a different drink. Since they are not washed, there is no need to rinse them to remove dishwashing residues. A great deal of time is saved simply by coding the utensils used and avoiding unnecessary washing, rinsing or sterilizing. Beyond this, the bartender very shortly becomes so familiar with his array of glasses that he does not even need to look at what he is doing in order to be sure that he selects the right one.

In most cases the space below the bar is strictly limited, in a lengthwise direction. It is therefore necessary to crowd the greatest possible number of utensils into a given span of racks. For this reason especially, the oval-shaped pedestal shown in FIG. 5 is especially useful. Forming the mouth portion of the lip 32 in the shape of an oval, as in FIG. 5, rather than in the shape of a circle, as in FIG. 3, permits the storing of more articles in a given space, even though the shape is not as attractive, in the eyes of some customers, as the rather graceful contour of FIG. 2.

The oval shape of the lip 32 not only facilitates close storing, it also permits one-hand operation with either of the serving glasses 22 or 23 and the measuring/shaker shell 19 engaged with the one or with the other. Thus engaged, both may be picked up with one hand. The thumb is placed above the wide portion of the lip 32, pressing against the serving glass 22 or 23; the forefinger engages the opposite side of the glass, pressing against it; and the palm of the hand is positioned at the narrow portion of the lip 32. The middle finger, the ring finger and the little finger are placed below the wide portion of the lip 32, and press the measuring/shaker shell 19 against the palm of the hand, thus forming a secure one-hand operation. Two drinks can be mixed at one time, one in each hand.

The coding of the racks with the shells which they support can be effected in various ways. I prefer simply to use matching colors, since this promotes instant recognition and is normally quite safe. However, it may be desirable to apply a different coding system in order to make certain that confusion does not result at the hands of a bartender who is color-blind. For this purpose, almost any appropriate symbols may be used. The simple geometric shapes are easily recognized, and may be displayed along the edge of the top of the bar which faces the bartender, placing a different one at the working end of each C-section channel or slide rack. The matching symbol is positioned on the body of all shaker shells to be mounted in that rack. Preferably the symbol is repeated often enough around the circumference of each shell to make sure that it can be readily seen, no matter which face is towards the bartender. Thus, purely for illustrative purposes, the diamond 35 marks the left hand shell 15, and the diamond 36 marks the left hand slide rack in which such shells are mounted. The remaining shells and racks may be marked in like manner, matching circles with circles, triangles with triangles, etc.

I claim:

1. The method of preparing potable drinks of the type produced by shaking measured quantities of at least two different constituents with ice particles, and then serving the shaken drink in a serving glass containing ice particles, which method comprises positioning a plurality of shaker shells in a horizontal support from which they depend with their open ends downward, and from which they are selectively and alternatively removable, each of said shaker shells being conspicuously marked with indicia designating one only of various kinds of drinks; placing in a shaker shell the indicated quantity of each of the ingredients desired to produce a blended drink of the type designated, bringing the open end of the shaker shell into registering engagement with the open end of a serving glass of the desired type, holding the serving glass and shaker shell as a unit while shaking them to effect complete mixing of the desired drink, turning the shaken drink, including its ice content, into the serving glass, removing the shaker shell, serving the drink, and replacing the shaker shell in the support mentioned, in preparation for use solely in mixing additional drinks of the species designated by the indicia on that shell.

2. The method of claim 1, wherein the selection and replacement of shells is facilitated by coding each support with the same indicia as is carried by the shaker shells which are supported therein.

3. The method of claim 1, wherein the shaker shell is provided with stepped graduations indicating the desired quantities of the ingredients to be combined in preparing a drink of the type corresponding to the indicia which it carries.

* * * * *